US005125154A

United States Patent [19]

Cross

[11] Patent Number: 5,125,154

[45] Date of Patent: Jun. 30, 1992

[54] AUTOMATED TERMINATION STATION AND METHOD OF USING SAME

[75] Inventor: Dan A. Cross, Seattle, Wash.

[73] Assignee: The Boeing Company, Seattle, Wash.

[21] Appl. No.: 590,661

[22] Filed: Sep. 28, 1990

[51] Int. Cl.[5] ........................ H01R 43/04; B23P 23/06

[52] U.S. Cl. ...................................... 29/861; 29/564.1; 29/566.3; 29/566.4; 29/748; 29/857

[58] Field of Search ............ 29/861, 857, 33 G, 33 M, 29/564, 564.1, 745, 748

[56] References Cited

U.S. PATENT DOCUMENTS

| | | | |
|---|---|---|---|
| 3,766,624 | 10/1973 | Grebe et al. . | |
| 3,842,496 | 10/1974 | Mercer . | |
| 3,881,374 | 5/1975 | Gudmestad | 81/9.51 |
| 4,043,017 | 8/1977 | Folk et al. | 29/749 |
| 4,107,838 | 8/1978 | Keen et al. . | |
| 4,403,407 | 9/1983 | Mazzola | 29/749 |
| 4,428,114 | 1/1984 | Teagno | 29/857 |
| 4,433,479 | 2/1984 | Suzuki et al. | 29/825 |
| 4,520,966 | 6/1985 | Bloch et al. | 242/54 R |
| 4,638,558 | 1/1987 | Eaton | 29/861 |
| 4,653,159 | 3/1987 | Henderson et al. | 29/33 |
| 4,653,160 | 3/1987 | Thorkildsen et al. | 29/33 |
| 4,669,162 | 6/1987 | Mihelich | 29/33 |
| 4,677,734 | 7/1987 | Bloch et al. | 29/564.2 |
| 4,715,099 | 12/1987 | Yoshida | 29/33 |
| 4,803,778 | 2/1989 | Cross | 29/857 |
| 4,858,311 | 8/1989 | Koch | 29/745 X |
| 4,916,811 | 4/1990 | Vehara et al. | 29/748 X |

FOREIGN PATENT DOCUMENTS 59060 9/1982 European Pat. Off. .

OTHER PUBLICATIONS

GMF Robotics Corporation A-510 Robot (Tough Enough for the Real World) Auburn Hills, Mich.; Apr. 1987.

*Primary Examiner*—Carl J. Arbes
*Attorney, Agent, or Firm*—Joan H. Pauly

[57] ABSTRACT

A system for processing wire segments includes a wire segment transport subsystem and at least one automated termination station (2, 102). The station (2, 102) includes a robot (4, 104) with a work envelope (105) in which a plurality of wire segment end processing devices are positioned. A work depot (32, 132) is positioned within the envelope (105) and is dimensioned to receive a batch of wire segments (100) loaded in a carrier (72, 172). The depot (32, 132) is independent of the transport subsystem but accessible thereto via an input station (24, 124) and an output station (26, 126) in which carriers (72, 172) may be queued. The robot (4, 104) processes the ends of the segments (100) loaded in the carrier (72, 172), one at a time.

19 Claims, 13 Drawing Sheets

AUTOMATED TERMINATION STATION AND METHOD OF USING SAME

GOVERNMENT RIGHTS

The government has rights in this invention.

TECHNICAL FIELD

This invention relates to systems for processing the ends of wire segments and, more particularly, to such a system in which batches of wire segments are processed in independent automated termination stations that are independent of a transport subsystem for the wire segments and that include a robot with a work envelope in which a plurality of end processing devices and a work depot for the wire segments are located.

BACKGROUND INFORMATION

The wiring for the electrical systems of aircraft is conventionally assembled outside the aircraft into wire harnesses that include large numbers of wire segments having opposite ends leading to various connectors. The number of wire segments in a single harness can be as large as several hundred. The manufacture of a wire harness is complicated and difficult to automate and, thus, is generally highly labor intensive. One of the major procedures in the manufacture of a harness is the processing of the ends of the wire segments. Such processing is commonly called "termination" and includes, but is not limited to, stripping insulation from the ends of the segments and installing electrical contacts and/or lugs on such ends.

One approach to increasing the efficiency of the manufacture of wire harnesses is to automate the processing of the wire segment ends. Known systems incorporating this approach have the problems of being relatively inflexible, retaining major inefficiencies, and being subject to frequent system shutdowns. One of the major reasons for these problems is that the individual wire segments are moved through the system and processed in a predetermined sequence. Thus, at any given point, the rate of movement of the segments through the system is governed by the segment end processing procedure or other procedure which has the longest completion time. In addition, such systems are vulnerable to total system shutdowns caused by a fault in any single one of a number of specific processing devices.

Systems for manufacturing electrical harnesses are disclosed in U.S. Pat. No. 3,766,624, granted Oct. 23, 1973, to R. K. Grebe et al.; U.S. Pat. No. 4,638,558, granted Jan. 27, 1987, to H. L. Eaton; U.S. Pat. No. 4,653,159, granted Mar. 31, 1987, to J. A. Henderson et al.; and U.S. Pat. No. 4,653,160, granted Mar. 31, 1987, to F. Thorkildsen et al. In the system disclosed in each of these patents, work stations are lined up along a conveyor. Individual wire segments are mounted on the conveyor which moves intermittently to allow the segments to be processed at the work stations. Wire harness manufacturing systems in which the wire ends are processed after the wire is laid out are disclosed in U.S. Pat. No. 3,842,496, granted Oct. 22, 1974, to P. W. Mercer; and U.S. Pat. No. 4,433,479, granted Feb. 28, 1984, to Y. Suzuki et al.

A system for manufacturing wire harnesses for aircraft in which the segments are moved sequentially through the system is disclosed in U.S. Pat. No. 4,520,966, granted Jun. 4, 1985, to J. T. Bloch and the present applicant; U.S. Pat. No. 4,677,734, granted Jul. 7, 1987, to the same inventors; and U.S. Pat. No. 4,803,778; granted Feb. 14, 1989, to the present inventor. In the system, individual wire segments are loaded into canisters and placed on a rotatable table. A robot swivels to pick up a canister, swivels to an equipment rack on which a plurality of termination devices are mounted, and then deposits the canister with the processed segment in a bay of a queuing subsystem for the lay-up phase of the manufacture.

DISCLOSURE OF THE INVENTION

The present invention relates to a subsystem that was developed as part of an overall system for manufacturing aircraft wire harnesses. The overall system is the subject of the applicant's copending application entitled "Wire Harness Manufacturing System", Ser. No. 07/590/650, field Sep. 28, 1990. The system includes a plurality of subsystems, such as a wire segment transport subsystem, an aspect of which is the subject of another copending application of the applicant entitled "Wire Carrier and Method of Using Same", Ser. No. 07/590,651, filed Sep. 28, 1990. In the early stages of the development of the system in general, and the present invention in particular, the applicant perceived that the manufacture of wire harnesses could be accomplished more efficiently by providing for delivery and processing of wire segments in batches.

The present invention provides a method of processing the ends of wire segments. According to an aspect of the invention, the method comprises providing an automated termination station having a robot with a work envelope and, within the envelope, a plurality of end processing devices and a work depot. The method includes positioning a first batch of wire segments in the depot. Each segment is positioned in an access position accessible to the robot. A plurality of the segments are processed one at a time. The robot is operated to move at least an end portion of each of said plurality of segments out of the access position to bring an end thereof into processing engagement with at least one of the devices and then return the segment to the access position. After the plurality of segments has been processed, the first batch is removed from the depot to make room for a second batch. Preferably, each batch of wire segments is loaded in a carrier, and the segments are positioned in the depot by positioning the carrier in the depot.

A feature of the invention which is preferred in most installations is engaging the carrier in the depot with an indexing device to enable the robot to accurately locate any one of the batch of wire segments. This feature provides a simple means of maintaining the accuracy of the processing by the robot. Another feature of the invention is carrying out the steps of positioning the carrier and processing the segments in stages. The carrier is positioned in an initial position in the depot, a portion of the plurality of wire segments is then processed, then the carrier is shifted to a second position in the depot, and then another portion of the plurality of wire segments is processed. This is an optional feature that is preferred when, for example, the configuration of the work depot or limitations on the movement of the robot limit the area of the depot which can be accessed by the robot, or the range of movement of the wire segment ends away from the carrier is limited.

In the system of the invention, the automated termination station preferably has an input station and an output station. The output station provides a place in which a first batch of wire segments may be positioned following processing so that a second batch may be moved into the work depot while the first batch is awaiting transport away from the automated termination station. The input station provides a place for the second batch to be queued within the automated termination station so that it may be moved into the work depot as soon as the processing of the first batch has been completed. The inclusion of the input and output stations in the automated termination station helps maximize utilization of the automated termination station and, thus, increases the efficiency of the overall system.

The invention also encompasses an independent automated termination station for processing the ends of wire segments, in a system for processing wire segments of the type having a wire segment transport subsystem. According to an apparatus aspect of the invention, the automated termination station comprises a robot with a work envelope, and a plurality of wire segment end processing devices and a work depot located within the envelope. The depot is dimensioned to receive a batch of wire segments, and preferably to receive a carrier in which the batch of segments is loaded. The depot is accessible to, but independent of the wire segment transport subsystem. The robot, processing devices, and depot are positioned relative to each other to enable the robot to process a plurality of segments, one at a time, as described above. The automated termination station may also include one or more of the other features discussed above.

In one embodiment of the automated termination station, a mounting plate is positioned generally above the work depot for mounting the end processing devices. The plate has a vertical opening extending therethrough aligned with the depot. Preferably, the plate surrounds the depot to enable the mounting of the devices on both sides and/or on the input and output ends of the depot. This arrangement helps maximize the efficient use of space in the termination station.

The system of the invention helps eliminate the problems discussed above that have been encountered in connection with known systems for manufacturing wire harnesses. By providing for the highly efficient processing of the ends of wire segments, the system of the invention contributes greatly to the efficiency of an overall wire harness manufacturing system. Since the automated termination station of the invention is independent of the wire segment transport subsystem, the other parts of the overall system are not subject to time delays caused by processing times for individual segment ends. In addition, an overall system into which an automated termination station of the invention is incorporated is not subject to complete shutdown caused by a failure of one of the devices in the automated termination station, or even the entire automated termination station.

The system of the invention is also highly flexible and may readily be incorporated into various types of manufacturing systems. A single or a plurality of termination stations may be provided in a given manufacturing system. The use of a plurality of termination stations has the advantage of enabling an increase in the number of different processing devices that may be used in the manufacturing system without creating system-wide time delays or increasing the risk of total system shutdown. A plurality of termination stations also facilitates providing redundant processing devices to, thus, further enhance the reliability of the system. In a given manufacturing system, the number of termination stations and the particular processing devices installed in each such station can be chosen to match the productivity of the end processing subsystem to the productivity of the other subsystems. This avoids time delays in other subsystems caused by end processing times and, therefore, helps maximize the overall system efficiency. When the type of harness being manufactured is changed, it is generally a simple matter to change the processing device configurations in the termination stations to maintain the work completion rate of the termination subsystem.

In each of the termination stations of the invention, the wire segments in a particular batch may be processed in any order. This ability to randomly process the segments within a batch enables a batch to be sent on to a further subsystem even though some individual segments may not have been processed because of a fault in a processing device. It also readily accommodates rerouting the batch of segments following processing to another termination station when the overall system includes such a station which has a processing device that is a duplicate or equivalent of a failed device.

These and other advantages and features will become apparent from the detailed description of the best modes for carrying out the invention that follows.

BRIEF DESCRIPTION OF THE DRAWINGS

In the drawings, like element designations refer to like parts throughout, and.

FIG. is a partially schematic plan view of a first preferred embodiment of the automated termination station.

BEST MODES FOR CARRYING OUT THE INVENTION

Figure 1:
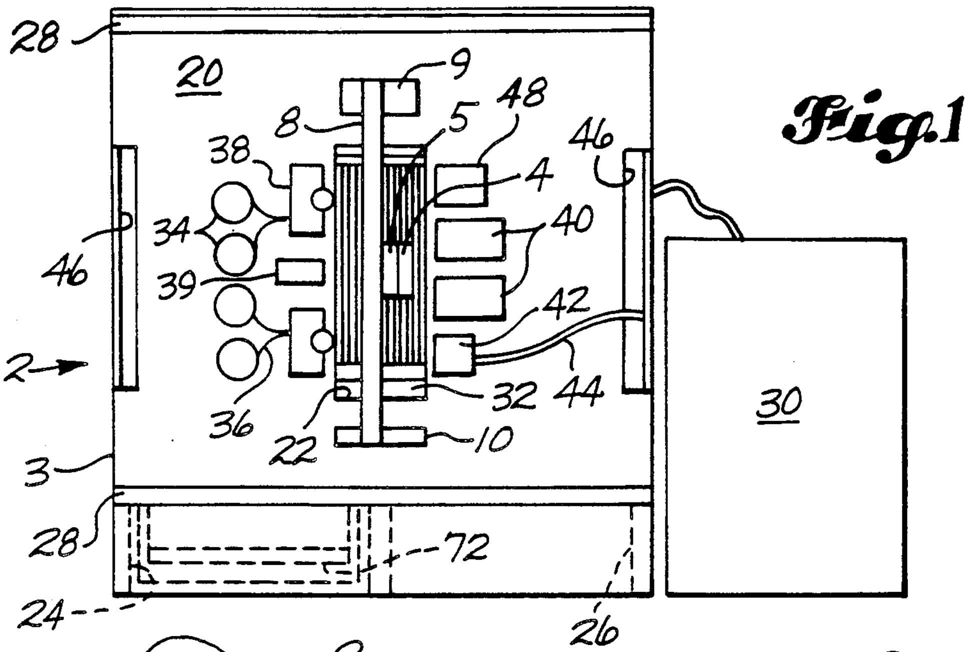

The drawings show two automated termination stations 2, 102 that are constructed according to the invention and that constitute the best modes for carrying out the apparatus of the invention currently known to the applicant. The drawings also illustrate the best modes for carrying out the method of the invention currently known to the applicant. The termination station of the invention is designed for use in a system for processing wire segments of the type having a wire segment transport subsystem. The illustrated embodiments of the termination station 2, 102 are shown interfacing with two different types of transport subsystems. In the embodiment shown in FIGS. 1-10, the wire segments are transported by loading them into carriers which are hand carried by a human operator to the termination station. The automated termination station 102 shown in FIGS. 11-13 interfaces with an endless belt conveyor 114 that runs past the station 102. These are only two examples of types of transport subsystems which may be used in connection with the automated termination station of the invention.

In its basic form, the automated termination station 2, 102 of the invention comprises a robot 4, 104, a plurality of wire segment end processing devices 38, 40, 138, 140, and a work depot 32, 132. The devices 38, 40, 138, 140 and work depot 32, 132 are positioned within the work envelope of the robot 4, 104. Preferably, the devices 38, 40, 138, 140 are plug-in replaceable so that they may be quickly removed and replaced in the event of a fault or a need for a different type of device. The depot 32, 132 is accessible to but independent of the transport subsystem. The depot 32, 132 is dimensioned to receive from the transport subsystem a batch of wire segments 100. It is preferably dimensioned to receive a carrier 72, 172 in which a batch of wire segments 100 is loaded.

The termination station 2, 102 preferably has an input station 24, 124 and an output station 26, 126. These stations 24, 124, 26, 126 are positioned between the work depot 32, 132 and the transport subsystem. They are independent of and directly accessible to the transport subsystem. The work depot 32, 132 is accessible to the transport subsystem via the input station 24, 124 and the output station 26, 126. Each of the input and output stations 24, 124, 26, 126 is dimensioned to receive a carrier 72, 172. They permit queuing of a carrier 72, 172 for the work depot 32, 132, while the wire segments 100 loaded in another carrier 72, 172 are being processed at the depot 32, 132, without affecting free flow of carriers 72, 172 through the transport subsystem. They also permit a carrier 72, 172 to be removed from the work depot 32, 132 so that the wire segments 100 in a second batch can be processed without delay while the carrier 72, 172 is awaiting transport away from the automated termination station 2, 102 by the transport subsystem.

FIGS. 1-10 illustrate a first preferred embodiment of the automated termination station 2 and the carrier 72 used in connection with the station 2. The station 2 is a compact freestanding installation that interfaces with a manual transport subsystem. The station 2 includes a cabinet-like housing 3. The input station 24 and output station 26 are positioned at the front of the housing 3. Each of the stations 24, 26 is appropriately labeled and has a sliding door 27. The work depot 32 is positioned behind the input and output stations 24, 26. A computer controller 30 is positioned next to the housing 3. The controller 30 independently controls the operation of the termination station 2. It also protects against data loss and provides an orderly shut down of the station 2 in the event of an interruption in the power supply to the station 2.

The top of the cabinet-like housing 3 forms a mounting plate 20 above the work depot 32. The processing devices 38, 40 and related apparatus and the robot 4 are mounted on the plate 20. A vertical opening 22 extends through the plate 20 and is vertically aligned with the depot 32. The plate 20 around the opening 22 is vertically offset from and surrounds the depot 32. This provides mounting space all around the depot 32. In the illustrated embodiment of the station 2, the end processing devices 38, 40 are mounted in the opposite sides of the opening 22 and the depot 32, and the robot support and actuating mechanism is mounted on the two ends. Two safety screens 28 are mounted on the plate 20 in front of and behind the processing devices 38, 40 and the robot support and actuating mechanism.

The robot 4 includes a control box 6 to which a cable 7 is attached for providing electric power and control signals to the robot 4. A shaft 11 depends downwardly from the box 6. A workhead 12 is attached to the lower end of the shaft 11 and extends laterally therefrom. The workhead 12 includes a gripper 14 for grasping wire segments 100, as described further below.

Figure 4:
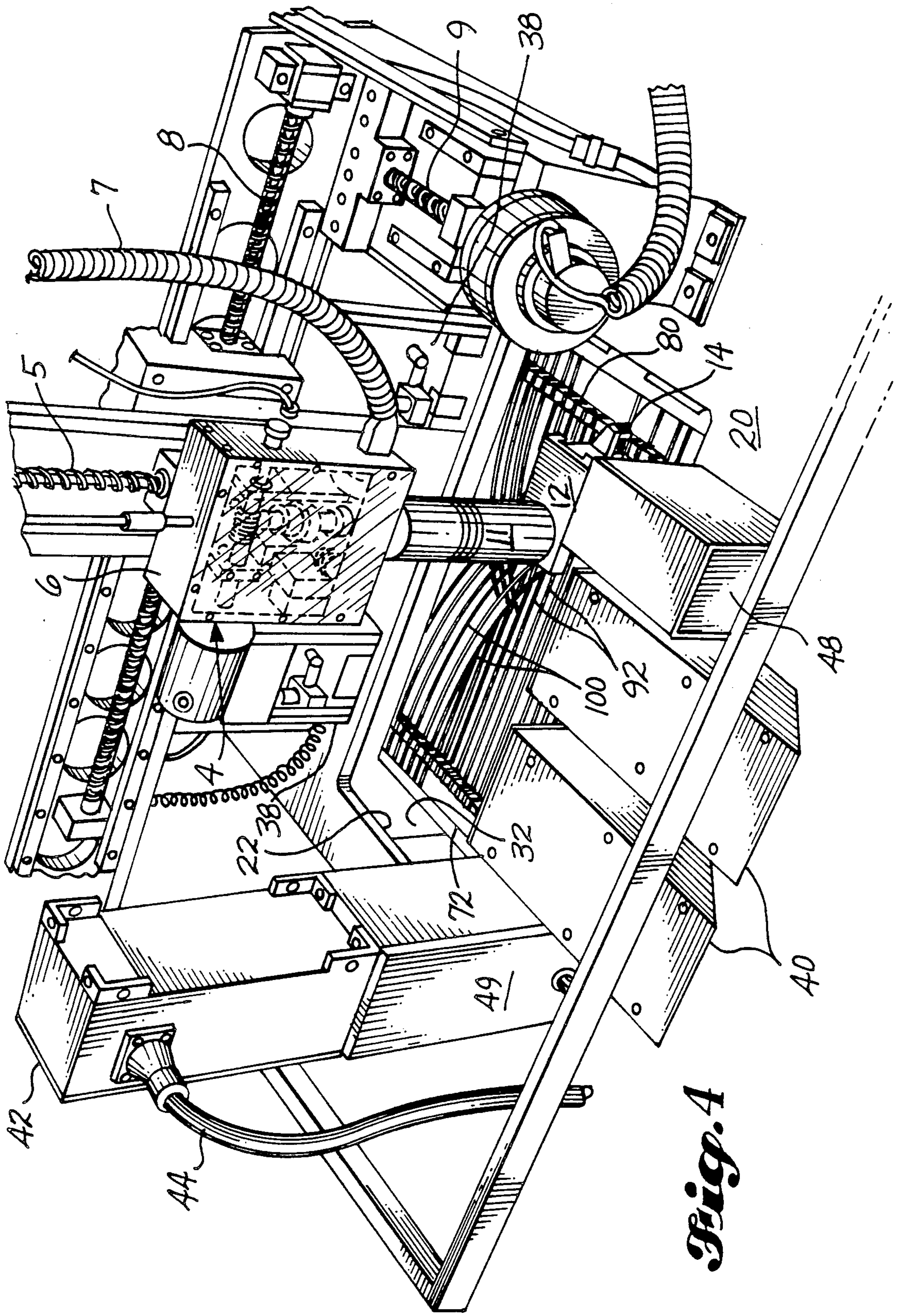
FIG. 4 is a pictorial view looking down on the automated termination station shown in FIGS. 1-3.

The robot actuating mechanism is best seen FIG. 4. It includes a vertical screw drive 5 to which the control box 6 is secured so that operation of the screw 5 moves the robot 4 upwardly and downwardly along a vertical axis. The screw drive 5 is in turn mounted on a longitudinal screw drive 8. The screw drive 8 extends along a horizontal axis perpendicular to the front face of the housing 3 in which the input and output station access doors 27 are located. The front end of the longitudinal screw drive 8 is supported on a bearing block 10 which is secured to the mounting plate 20 adjacent to the forward edge of the opening 22. The rear end of the longitudinal screw drive 8 is secured to a lateral screw drive 9 which is securely mounted to the plate 20 adjacent to the rear edge of the opening 22. The lateral screw drive 9 moves the entire robot 4, along with the vertical and longitudinal screw drives 5, 8, laterally along a horizontal axis perpendicular to the axis of the longitudinal drive 8. As this apparatus is moved by the lateral screw drive 9, the forward edge of the longitudinal screw drive 8 is supported by and slides along an upper bearing surface of the block 10.

Referring to FIGS. 1 and 4, the wire segment end processing devices 38, 40 are positioned along the side edges of the opening 22 in the mounting plate 20. The devices include two crimpers 38 mounted on one side of the opening 22 and two strippers 40 mounted on the opposite side of the opening 22. Each of the devices 38, 40 has multiple entry holes for different gauge wires. The holes are funnel-shaped to guide the wire segment ends. The strippers 40 are preferably of the type disclosed in the applicant's copending applications "Improved Rotary Wire Stripper", Ser. No. 07/521,445, filed May 10, 1990; "Notched Blade for Rotary Wire Stripper", Ser. No. 07/446,181, filed Dec. 5, 1989; and "Wire Guide for Rotary Wire Stripper", Ser. No. 07/441,178, filed Nov. 27, 1989. A trimmer 48 is mounted rearwardly of and adjacent to the strippers 40 along the same side edge of the opening 22. The trimmer 48 is used for cutting wire segment ends to exact length, relative to the robot gripper position, before the insulation is stripped from the ends. This allows the robot 4 to insert a wire end a known distance into the stripper 40 to yield a desired amount of exposed wire conductor. Vibrator bowls 34 are mounted on the plate 20 laterally behind the crimpers 38. Plastic feed tubes 36 extend from the bowls 34 to the crimpers 38 to feed contacts 101 to the crimpers 38 to be crimped onto the stripped ends of the segments 100. The vibrator bowls 34 operate in a known manner to feed contacts 101, one at a time, to the crimpers 38. The controller 30 automatically adjusts the crimpers 38 for each contact type and wire gauge. One or both of the contact crimpers 38 and associated vibrator bowls 34 shown in the drawings and described above may be replaced with other termination devices, such as an automated bulk reel feed terminal lug crimper.

A video inspector 42, 49 is positioned adjacent to and forward of the strippers 40. The inspector includes a light chamber 49 and a camera 42 looking down into the chamber 49 for visually verifying that the stripping operation has fully and cleanly removed the end slug of insulation, the strip length is within a predetermined tolerance, the stripped conductor is straight enough for insertion into a crimper funnel, and there is no unacceptable marring of the conductor. A pull tester 39 is positioned between the crimpers 38, as best seen in FIG. 1. The tester 39 is used to verify that contacts 101 have been properly crimped onto segment ends. The crimp connections may also be visually inspected for proper positioning of the lot 101 relative to the insulation and engagement of all conductor strands. When the video inspector 42, 49 or the pull tester 39 detects a stripping or crimping error, the segment end is trimmed and the termination procedure is repeated.

A cable 44 connects the video inspector 42, 49 to the computer controller 30. Referring to FIG. 1, the cable 44 extends laterally from the inspector 42, 49 across the mounting plate 20 to a slot 46 that extends vertically through a lateral edge portion of the plate 20. The slot 46 receives the cable 44 and other cables (not shown) associated with the processing and other devices located in the station 2.

Figures 5, 6:
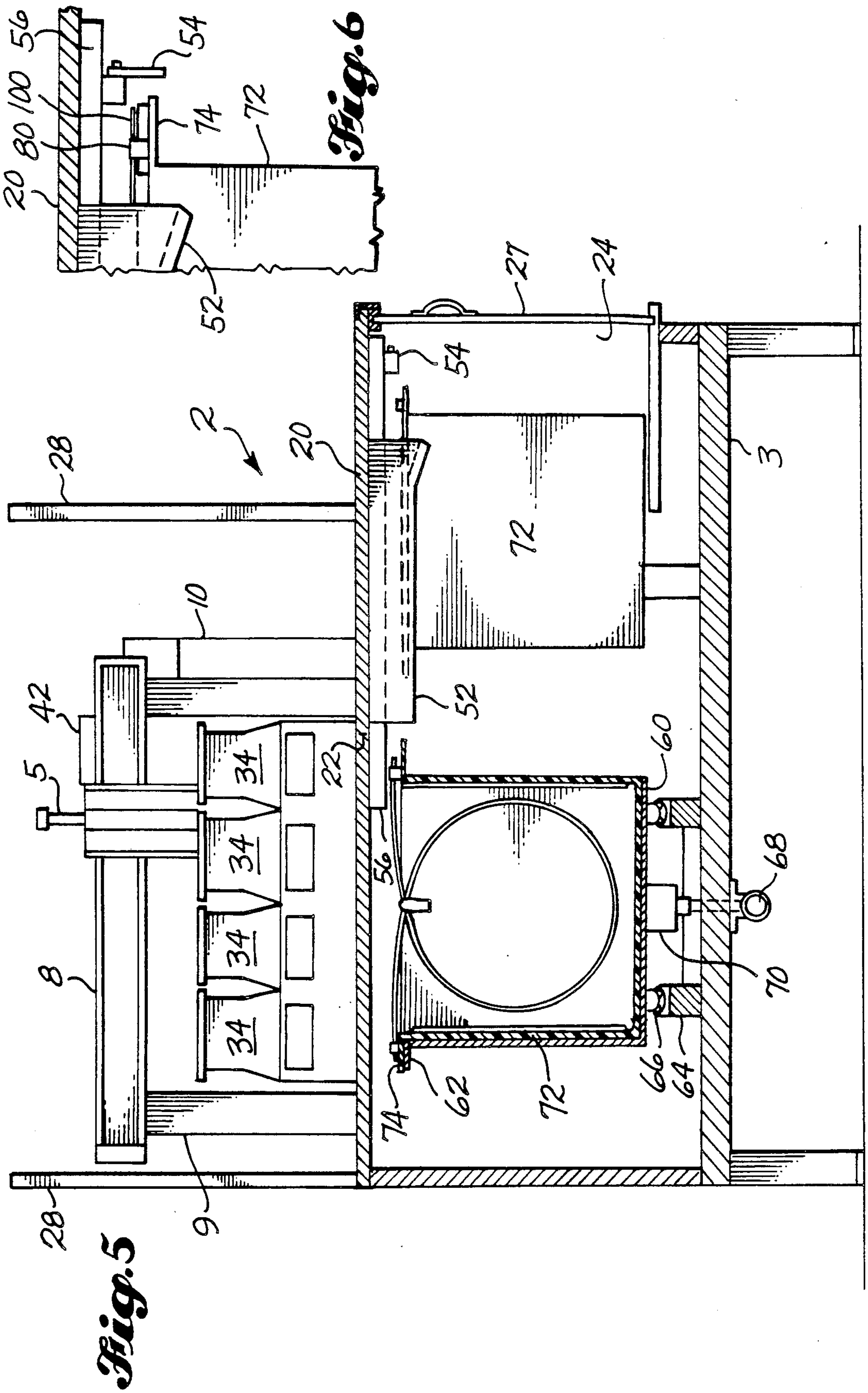
FIG. 5 is a side elevational view of the termination station shown in FIGS. 1-4, with parts shown in section.
FIG. 6 is an enlarged fragmentary view of the push member and surrounding structure shown in FIG. 5, with the push member shown in an engaged position.

FIGS. 5 and 6 illustrate the mechanism for moving a carrier 72 within the automated termination station 2. The mechanism includes a guide rack 52, which engages the top horizontal flange 74 of the carrier 72, and a push member 54 carried by a rodless air cylinder 56 of a known type. In order to introduce the carrier 72 into the input station 24, an operator rotates the push member 54 into the retracted position shown in FIG. 5, slides the carrier 72 into the guide rack 52, and lowers the push member 54 into the position shown in FIG. 6. The member 54 automatically releasably locks into the retracted position for convenient loading of the carrier 72. The carrier 72 remains in the input station 24 until the controller 30 directs that the carrier 72 be moved from the input station 24 to the work depot 32. The rodless air cylinder 56 is operated to move the carrier 72 rearwardly from the input station 24. The cylinder 56 slides the carrier 72 along the guide rack 52 into a carrier transport 60. The transport 60 is a rectangular structure with an open top, an open front, and an upper horizontal flange 62 which supports the carrier flange 74, as shown in FIG. 5. Preferably, pins (not shown) carried by the transport 60 engage suitable openings in the flanges 62, 74 to align the flanges 62, 74 and position the carrier 72 in the transport 60. The transport 60 is mounted on laterally extending rails 64 by means of bearings 66. When the carrier 72 has been brought into position in the transport 60, the operation of the cylinder 56 is discontinued, and a screw drive 68 is operated to move the transport 60 and the carrier 72 positioned therein laterally to the work depot 32. The drive mechanism includes a retractable stop block 70 to prevent further movement of the transport 60 and carrier 72 when they have reached a predetermined position in the work depot 32.

All the segments 100 in the carrier 72 that are required to be processed at the station 2 may be processed with the carrier 72 in a single predetermined position in the depot 32. Alternatively, the screw drive 68 and its stop block 70 may be operated during the processing of the segments 100 to shift the carrier 72 to additional predetermined positions in the depot 32. This allows the positioning of different portions of the batch of wire segments 100 for processing by the robot 4.

Figure 9:
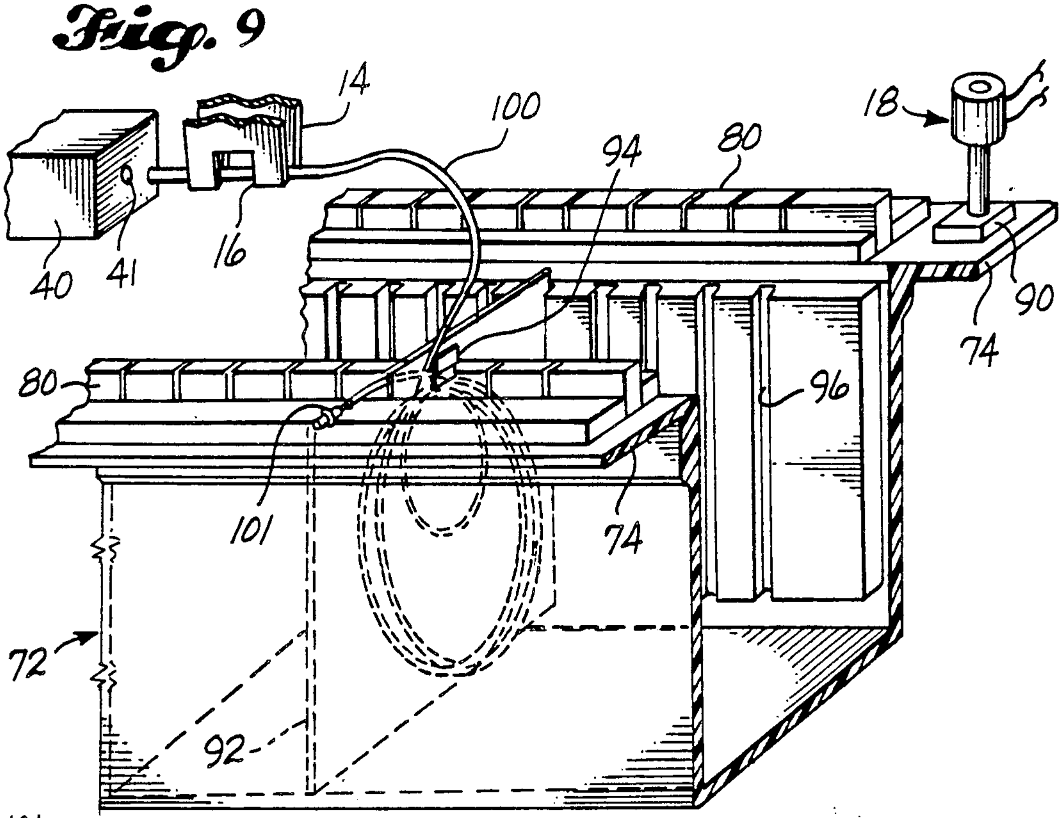
FIG. 9 is a pictorial view of a carrier in the work depot of the automated termination station shown in FIGS. 1-5, with portions of the carrier cut away and the mounting and supporting structure of the station omitted to further illustration of the processing of a wire segment.

The precise positioning of the carrier 72 in the depot 32 may be facilitated by the use of an indexing device. One type of such a device is illustrated in FIG. 9. It is an indexing solenoid 18 that is mounted on the underside of the plate 20. After the carrier 72 has moved into the depot 32, the solenoid 18 is operated to extend the lower tapered end of a rod into a locator member 90 mounted on the top horizontal flange 74 of the carrier 72. The tapering of the rod automatically adjusts slight misalignments in the position of the carrier 72. Preferably, the carrier 72 has two locator members 90 on opposite corners, and the station 2 is provided with a sufficient number of indexing solenoids 18 to engage both locator members 90 in each of the predetermined carrier positions. The precise positioning of the carrier 72 enables the robot 4 to precisely locate any one of the segments 100 loaded in the carrier 72. The entry holes in the processing devices 38, 40 are also indexed to a common reference point to enable the robot 4 to accurately move a segment end into engagement with the correct entry hole.

As an alternative to the precise positioning of the carrier 72 in the work depot 32, the station 2 may be provided with a vision device to enable the robot 4 to locate particular wire segments 100. The device could be programmed to detect edifying marks on the carrier 72 or on the segments 100. The exact positions of the carrier 72 and segments 100 in the depot would not necessarily be predetermined. All that would be required is to have the identifying marks within the view of the device and the segments 100 accessible to the robot 4.

Figure 7:
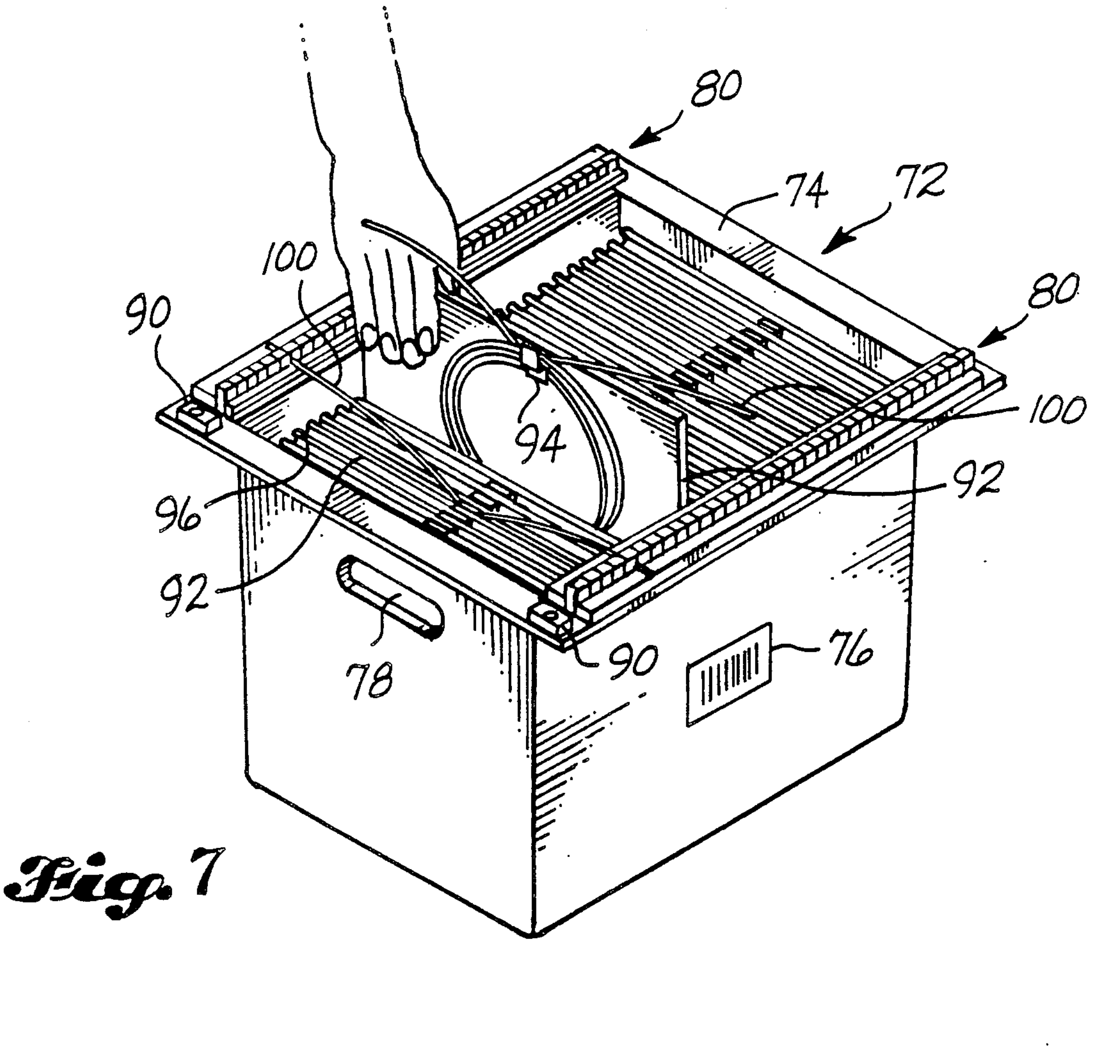
FIG. 7 is a pictorial view of the carrier shown in FIGS. 2-5 being loaded with wire segments.

The preferred embodiment of the carrier 72 for use with the automated termination station 2 shown in FIGS. 1-6 is best seen in FIG. 7. The carrier 72 is the subject of the applicant's copending application entitled "Wire Carrier and Method of Using Same". The basic structure of the carrier 72 is a hollow rectangular box with an open top. A horizontal flange 74 extends outwardly from the open top on all four sides of the box. A bar code 76 is positioned on one side of the box. A hand grip slot 78 is provided on each of the two sides perpendicular to the side with the bar code 76. The inner sidewall surfaces are provided with opposite pairs of vertical slots 96 for receiving a plurality of dividers 92. Each divider 92 has a hanger 94 attached to one face a short distance below the top edge. Wire segments 100 are loaded into the carrier 72 by hanging them in coiled configurations on the hangers 94, as illustrated in FIGS. 5, 7, 9, and 10. The ends of each segment 100 are engaged in two clamps 80 which are mounted on opposite portions of the flange 74. Two locator members 90 are also mounted on the flange 74. Each member 90 has a vertical opening for receiving the rod of an indexing solenoid 18.

Figure 8:
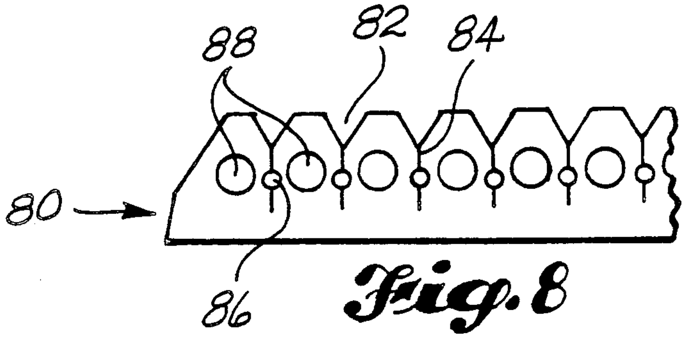
FIG. 8 is an elevational view of the carrier clamp.

The details of the structure of the clamp 80 can be seen in FIG. 8. The clamp 80 includes a strip of silicone rubber which has a plurality of V-shaped grooves 82 on its upper surface. A slit 84 extends downwardly from the bottom of each groove 82. Near the bottom of the slit 84 is a round opening 86. Larger round openings 88 are formed in the material of the strip between each adjacent pair of slits 84 and each end slit 84 and the adjacent end of the strip. When a segment 100 is loaded into the carrier 72, each end of the segment 100 is engaged in a V-groove 82 of the corresponding clamp 80. The end is pushed down into the groove 82 and the slit 84 to the opening 86. The functioning of the openings 86, 88 to facilitate insertion of a wire segment 100 and allow compression of the silicone rubber are described further in applicant's aforementioned copending application. It is anticipated that the carrier 72 will normally be loaded by hand, as illustrated in FIG. 7.

Figure 2:
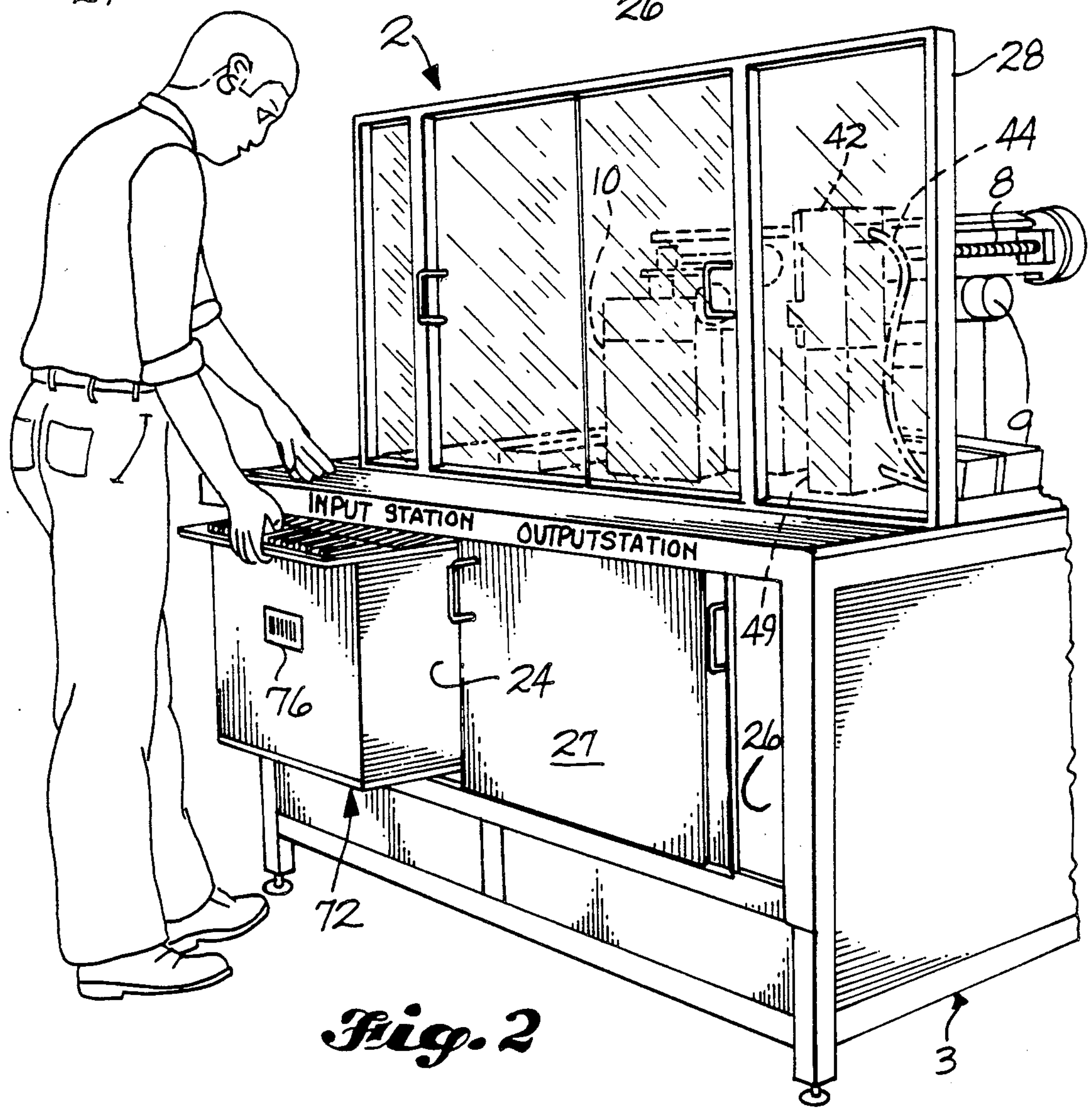
FIG. 2 is a pictorial view of the station shown in FIG. 1, illustrating an operator introducing a wire segment carrier into the input station.
Figure 3:
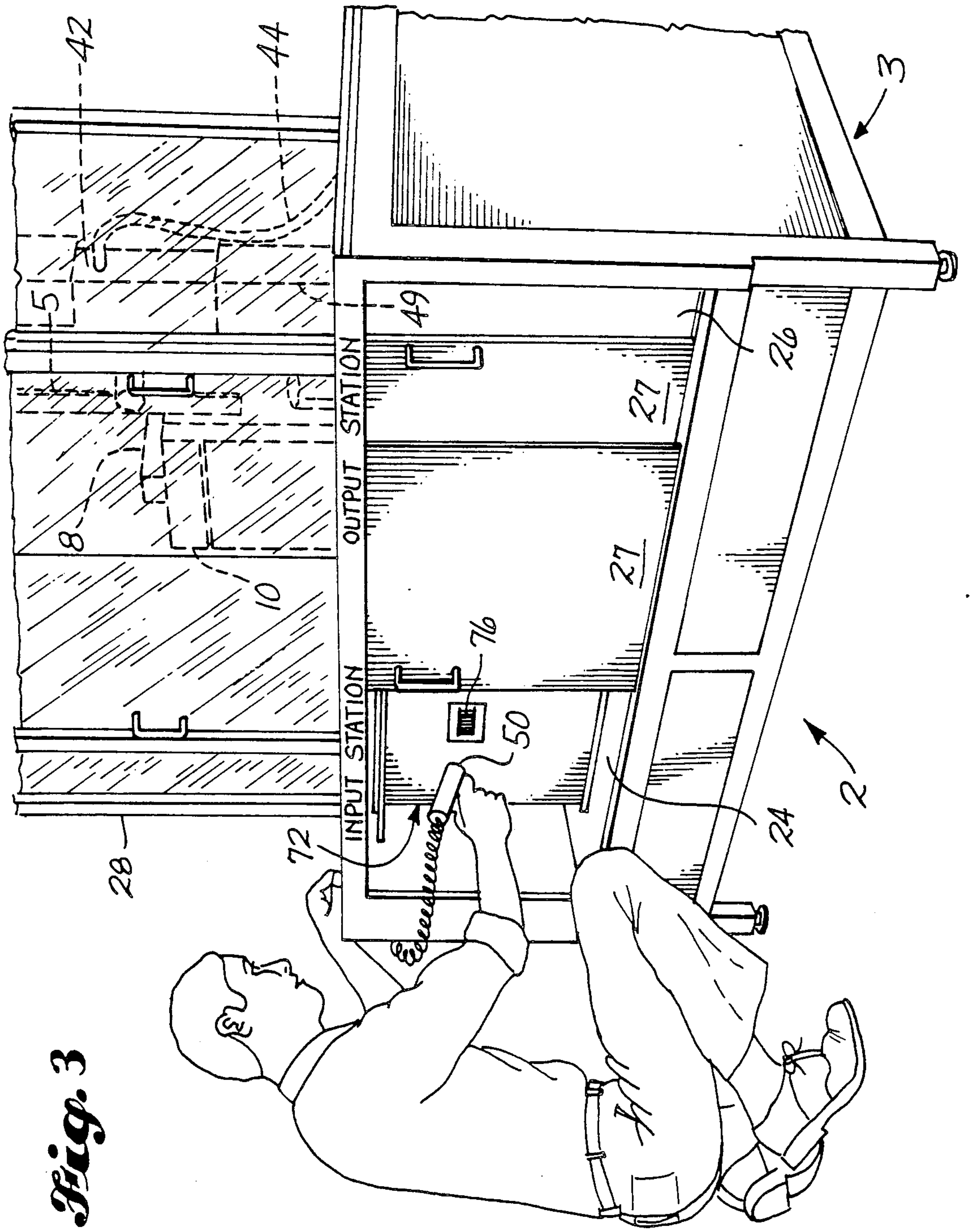
FIG. 3 is like FIG. 2 except that it shows the carrier in the input station and the operator inputting the carrier bar code information.

The method of the invention may be practiced using a variety of types of automated termination stations having the basic characteristics of the illustrated stations 2, 102. These characteristics include a robot with a work envelope and a plurality of end processing devices and a work depot within this envelope. With specific reference to the automated termination station 2 shown in FIGS. 1–6, 9, and 10, the method comprises introducing a batch of wire segments 100 loaded in a carrier 72 into the input station 24. FIG. 2 illustrates a human operator sliding a carrier 72 into the input station 24. After the operator has positioned the carrier 72 in the station 24, he uses a bar code reader 50 of a known type to read the bar code 76 on the carrier 72 and input the bar code information into the automated termination station 2. FIG. 3 illustrates the reading of the bar code 76. Once the bar code information has been input into the station 2, the operator may close the door 27, and the controller 30 takes over the handling of the carrier 72 and the processing of the wire segments 100.

The movement of the carrier 72 from the input station 24 to the work depot 32 is described above. The predetermined position into which the wire segments 100 to be processed are moved by the screw drive 68 is within the work envelope of the robot 4 to make the segments 100 accessible to the robot 4. While the carrier 72 is in the work depot 32, the operator may introduce a second carrier 72 into the input station 24 so that the second carrier 72 will be immediately available for processing in the work depot 32 as soon as the controller 30 directs movement of the first carrier 72 into the output station 26.

The procedure for moving the first carrier 72 into the output station 26 is substantially the reverse of the procedure for moving the carrier 72 from the input station 24 to the depot 32. The screw drive 68 is operated to move the carrier 72 laterally into alignment with the output station 26. Then, a second rodless air cylinder is operated to cause a push member to engage the rear edge of the flange 74 of the carrier 72 and move the carrier 72 forwardly into the output station 26. The transport flange 62 has a slot formed therein to provide clearance for the push member. A suitable stop is provided in the output station 26 to prevent overtravel of the carrier 72. Moving the first carrier 72 into the output station 26 allows the second carrier 72 to be moved into the work depot 32, and the wire segments 100 loaded in the second carrier 72 to be processed, while the first carrier 72 awaits transport away from the automated termination station 2 by the operator.

Figure 10:
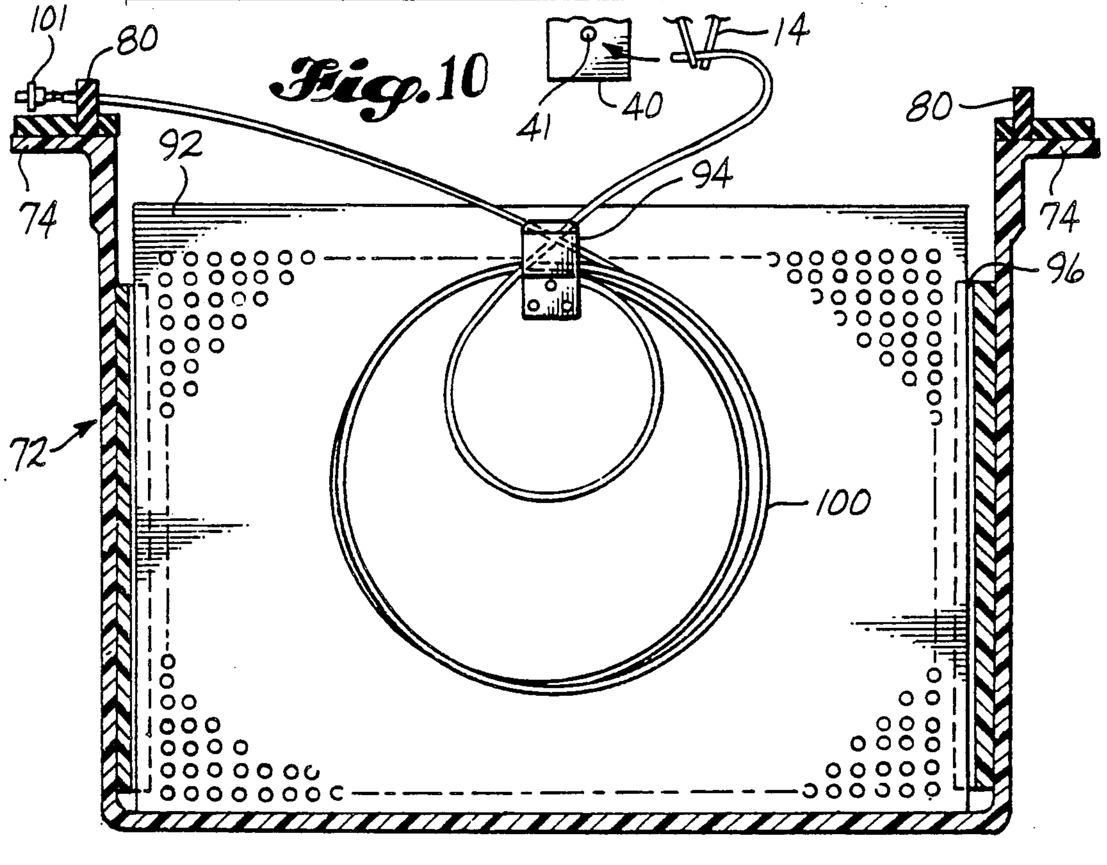
FIG. 10 is a vertical sectional view of the carrier shown in FIG. 9.

The processing of the wire segment ends in the depot 32 is illustrated in FIGS. 9 and 10. The robot 4 processes each of the segments 100 that is to be processed at the station 2, one at a time. The two ends of an individual segment 100 may be processed one after the other. However, it is generally preferable to process other segment ends in between in order to minimize the movements of the robot 4. Less than all of the segment ends in the batch may be processed at the station 2 for various reasons. For example, some of the segment ends may require manual processing or processing by equipment located at a different automated termination station.

The robot 4 moves to place its gripper 14 in position for grasping an end portion of a designated segment 100. The gripper 14 has a slot 16 extending therethrough to enable the opposite legs of the gripper 14 defining the slot 16 to straddle the carrier clamp 80. This enables the gripper 14 to obtain a firm grip of the segment 100 on both sides of the clamp 80 to facilitate removal of the segment 100 from the clamp 80. The robot 4 moves to bring the freed end portion of the segment 100 into processing engagement with one of the end processing devices 38, 40. As the end portion of the segment 100 is pulled away from its predetermined access position, one of the coils of the main portion of the segment 100 hanging from the hanger 94 is decreased in diameter, as shown in FIGS. 9 and 10 and discussed in more detail in applicant's copending application directed toward the carrier 72. FIGS. 9 and 10 show the end portion of the segment 100 being brought toward the wire-engaging funnel opening 41 of a stripper 40. After the end of the segment 100 has been stripped and inspected, the robot 4 may move it over to a crimper 38 for receiving a contact 101.

When the required processing of the segment end portion has been completed, the robot returns the segment end portion to its predetermined access position. The spring action of the reduced size coil of the segment 100 assists the robot 4 in returning it into its loaded position in the carrier 72. The robot 4 reinserts the segment end portion into the clamp 80. The straddling of the clamp 80 by the legs of the gripper 14 facilitates the reclaiming of the segment.

The robot continues to process the segment ends, one at a time, until all of the required processing has been completed. As noted above, the carrier 72 may be shifted in position within the depot 32 during the processing of the segments 100. For example, for the type of robot 4, termination station configuration, and carrier 72 illustrated in FIGS. 1–10, a batch of wire segments 100 in the carrier 72 is preferably divided into groups of about five segments 100 each. After processing the segments 100 in one group, the carrier 72 is shifted to bring another group of segments 100 into processing position.

Figure 11:
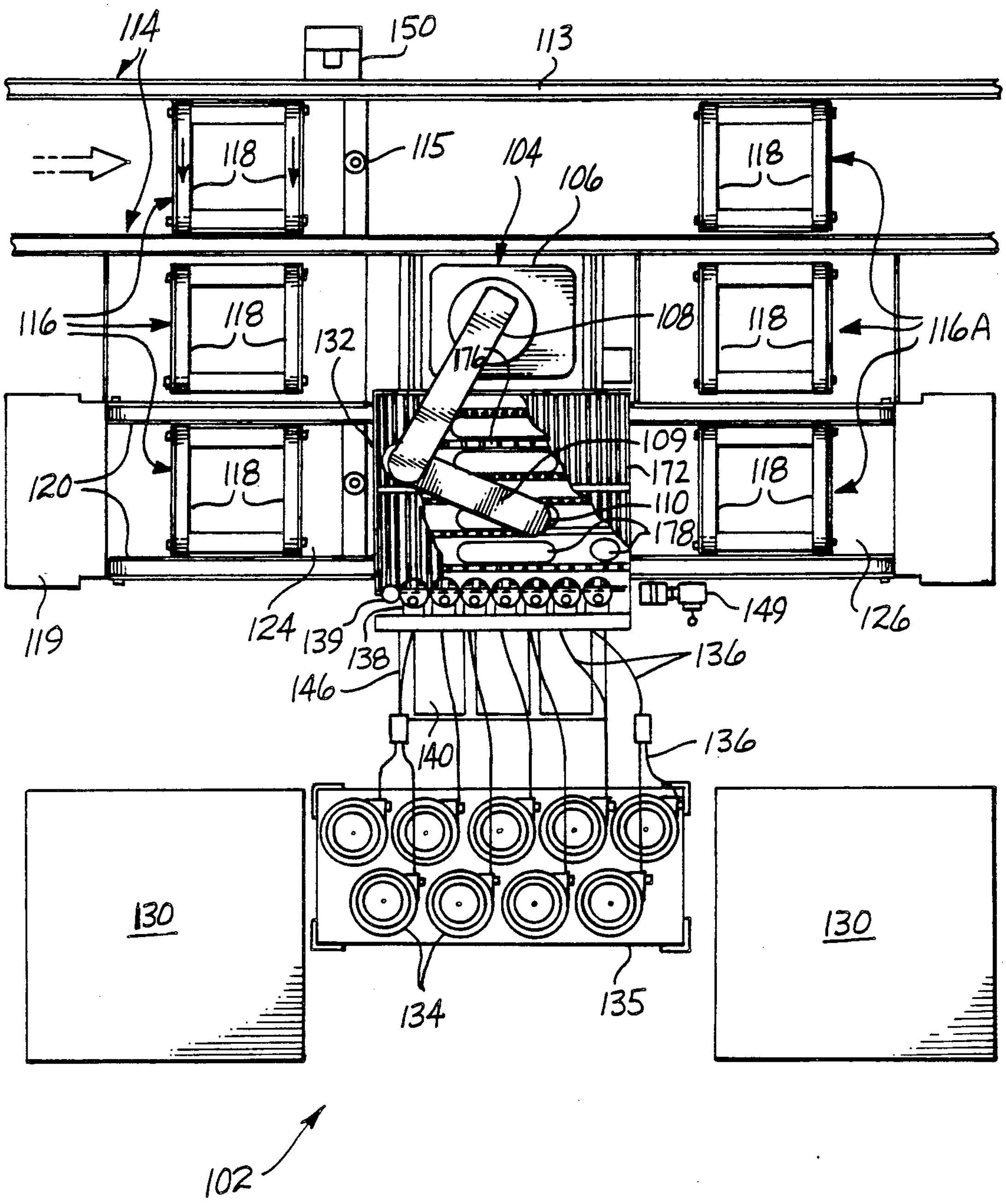
FIG. 11 is a plan view of a second preferred embodiment of the automated termination station.
Figure 12:
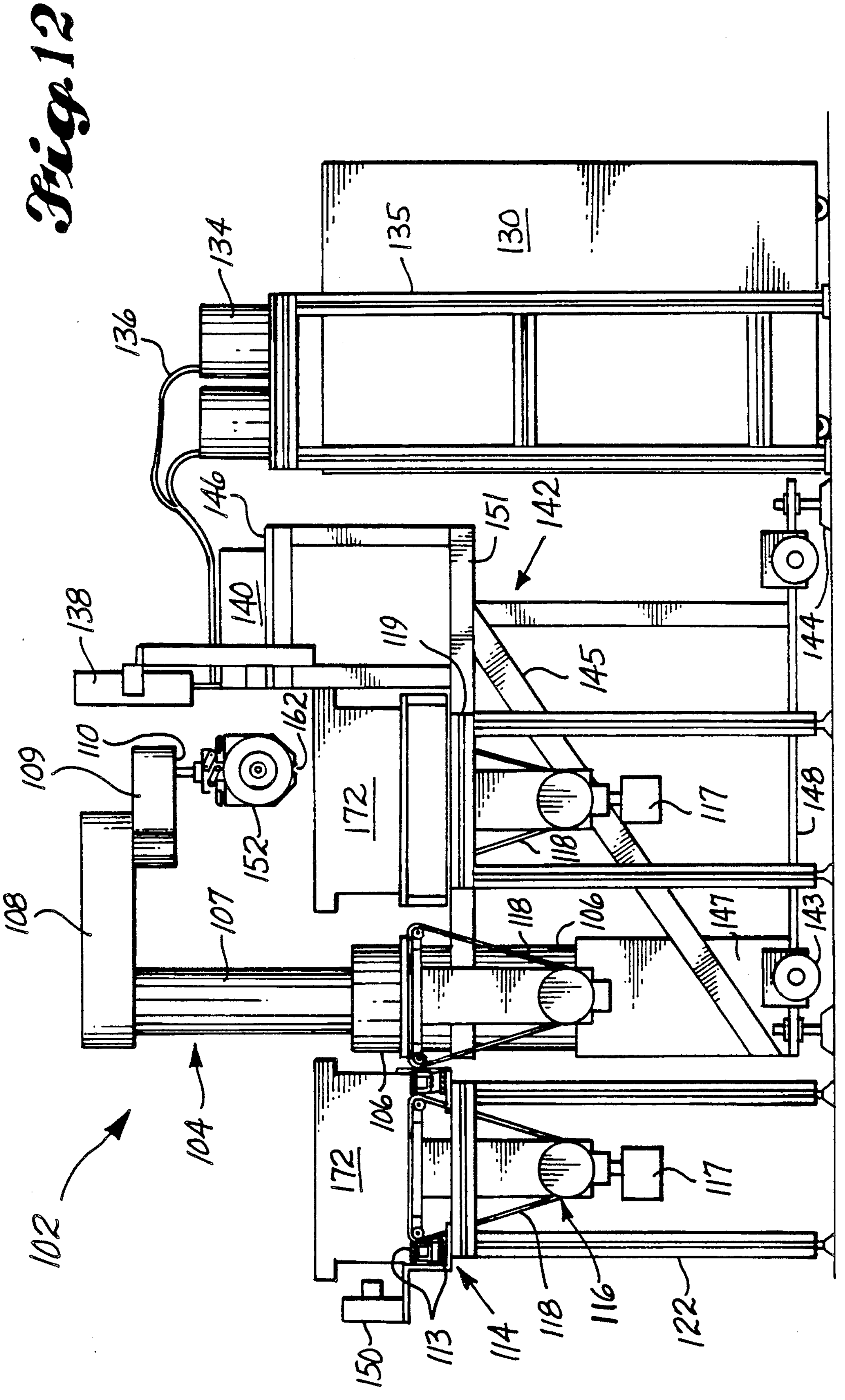
FIG. 12 is an end elevational view of the station shown in FIG. 11, with the foreground controller omitted.
Figure 13:
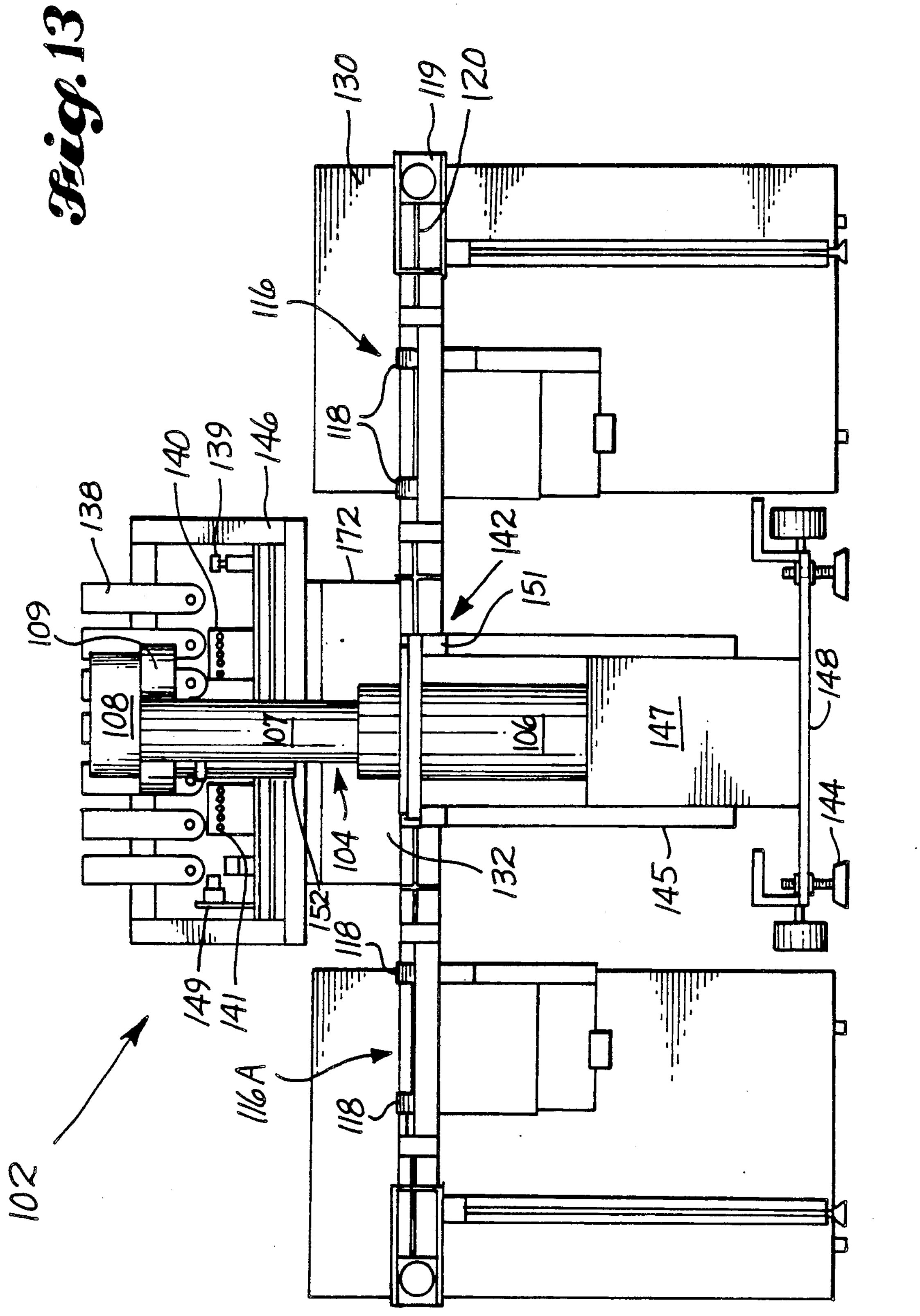
FIG. 13 is a side elevational view of the station shown in FIGS. 11 and 12, with the main conveyor omitted in the foreground and the vibration bowls and isolated table omitted in the background.

The second preferred embodiment of the automated termination station 102 is shown in FIGS. 11–13. It is positioned along one side of an endless-belt conveyor 114 that is part of the wire segment transport subsystem of an overall system for manufacturing aircraft wire harnesses. Carriers 172 move along the conveyor 114 in the forward direction indicated by the arrow in FIG. 11. A bar code reader 150 is mounted on the side of the conveyor 114 opposite the automated termination station 102. Each carrier 172 used with the system has a bar code printed on a forward side portion thereof. When the reader 150 detects a carrier 172 designated for processing at the station 102, a stop mechanism 115 is activated by the station controller 130, or another controller separate from the station 102, to halt the forward movement of the carrier 172. The controller also temporarily deactivates the portion of the main conveyor 114 on which the carrier 172 is located. The conveyor 114 has short gaps to make this possible. After the carrier 172 and conveyor section have been stopped, the carrier 172 is moved laterally off the conveyor 114 into the input depot 124 of the station 102 by a lateral transfer mechanism.

The transfer mechanism includes three short aligned conveyors 116. One of the conveyors 116 is mounted between the two endless belts 113 of the main conveyor 114 and is provided with a raising mechanism 117 (FIG. 12) to raise the two belts 118 of the conveyor to a height at least as high as the belts 113 of the main conveyor 114 and into engagement with the bottom of the carrier 172, as shown in FIG. 12. The lateral conveyor 116 in the station 102 adjacent to the main conveyor 114 has a fixed height. The other conveyor 116 in the station 102 has a raising mechanism 117 and is raised and lowered with the conveyor 116 mounted between the belts 113 of the main conveyor 114 in order to clear the belts 120 of an inner positioning conveyor 119. The three lateral conveyors 116 are activated to move the carrier 172 laterally into the input station 124. A suitable stop (not shown) is provided to limit lateral movement of the carrier 172.

The positioning conveyor 119 is parallel to the main conveyor 114 and is operated to move carriers 172 from the input station 124 into the work depot 132, and from the work depot 132 into the output station 126. Suitable stops (not shown) are provided to prevent overtravel of a carrier 172 being moved into the work depot 132 or output station 126. Preferably, the stops precisely locate the carrier 172 so that the robot 104 can accurately locate individual wire segments 100. The station 102 could, instead, be provided with a vision device, as discussed above in connection with the embodiment of FIGS. 1–10.

The termination station 102 has a second lateral transfer mechanism including three lateral conveyors 116A with essentially the same structure as the conveyors 116. The conveyors 116A are operated to shift a carrier 172 laterally out of the output station 126 back onto the main conveyor 114. The carrier 172 may be transferred out of the termination station 102 as soon as it has been moved into the output station 126. Alternatively, it may be retained in the output station 126 until a more convenient time, such as when the traffic on the main conveyor 114 is lighter or when the next termination station or other work location is ready for the carrier 172.

Figure 14:
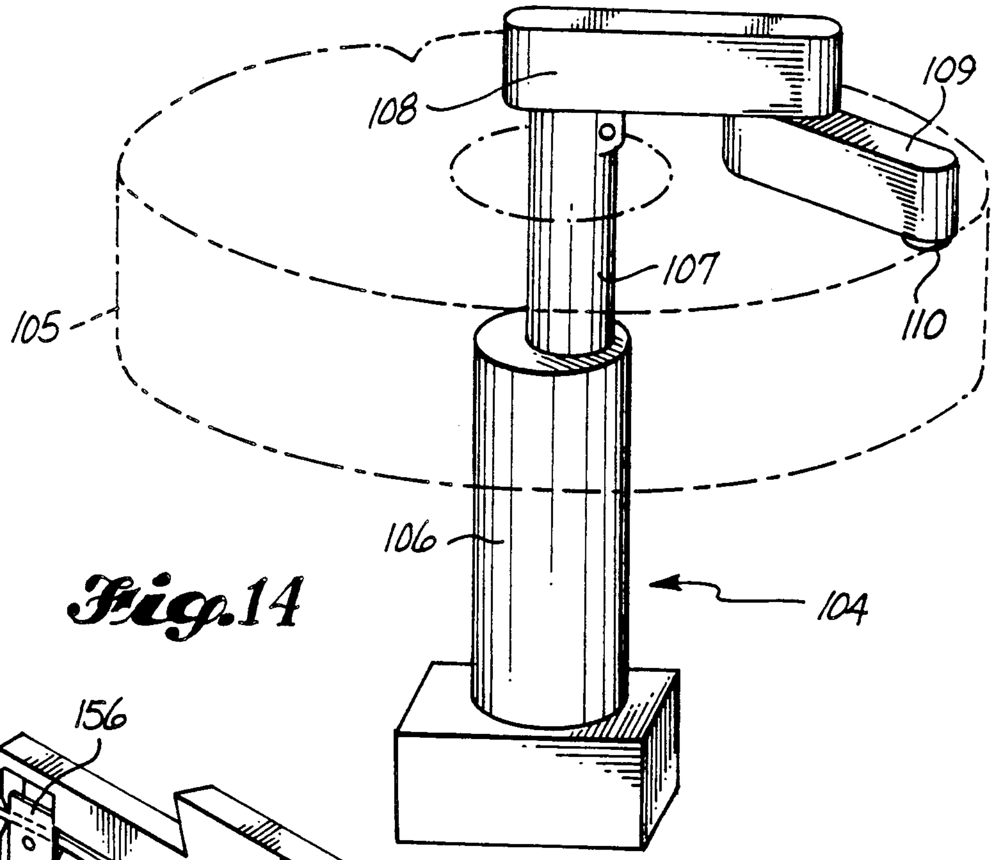
FIG. 14 is a pictorial view of the preferred embodiment of the robot in the station shown in FIGS. 11-13, illustrating the robot's work envelope.

The automated termination station 102 includes a robot 104 with a work envelope 105, illustrated in FIG. 14. As discussed above, the work depot 132 and a plurality of wire segment end processing devices are positioned within the work envelope 105. The robot may take various forms. In the illustrated preferred embodiment, the robot 104 is the type of robot sold by GMF Robotics Corporation under the designation A-510. The robot 104 has a vertically translatable shaft 107 mounted on a rotatable base 106. An inner arm 108 is mounted on the top of the shaft 107. An outer arm 109 is pivotably connected to an outer end portion of the inner arm 108. The outer end of the outer arm 109 has a wrist mounting 110 for mounting a work head (gripper). The work head may take various forms. Three examples of work heads are shown in FIGS. 12, 16, and 17–21.

The robot 104, the four lateral conveyors 116, 116A, and the wire segment end processing devices 138, 140 are mounted on a movable support frame 142. The support frame 142 is separate from the support frame 122 for the main conveyor 114 and the two lateral conveyors 116, 116A associated therewith. The processing devices mounted on the station support frame 142 include wire strippers 140 and crimpers 138. The station 102 is provided with vibrator bowls 134 for feeding contacts to the crimpers 138 through feed tubes 136. The vibrator bowls 134 are mounted on a separate isolated table 135. A pair of computer controllers 130 are positioned on opposite sides of the isolated table 135 for independently controlling the operation of the termination station 102. Preferably, one of the controllers 130 is a vision controller that controls the visual inspection of the segments 100 and operates under the direction of the other controller 130. The support frame 142 gives the station 102 a modular construction so that it may be easily moved away from the main conveyor 114 and replaced by another termination station with the same or a different configuration. This might be done, for example, to facilitate routine maintenance of the termination station 102 being removed or to permit replacing it with another station with different capabilities more suitable to the manufacture of a particular wire harness.

The frame 142 includes a platform 148 and a lower portion 147 that support the base 106 of the robot 104. The lower portion 147 is reinforced by a pair of diagonal beams 145. The frame 142 also includes an offset upper mounting frame 146 for mounting the crimpers 138 and strippers 140. A pull tester 139 and a video inspector 149 are mounted on the mounting frame 146 in association with the crimpers 138 and strippers 140. Horizontal tie beams 151 locate the robot 104 relative to the work depot 132 and the processing devices 138, 140. The entire support frame 142 is supported on the ground on adjustable leveling feet 144. Wheels 143 are carried by the platform 148 to facilitate the moving of the frame 142 and the apparatus mounted thereon to a different location.

Figure 15:
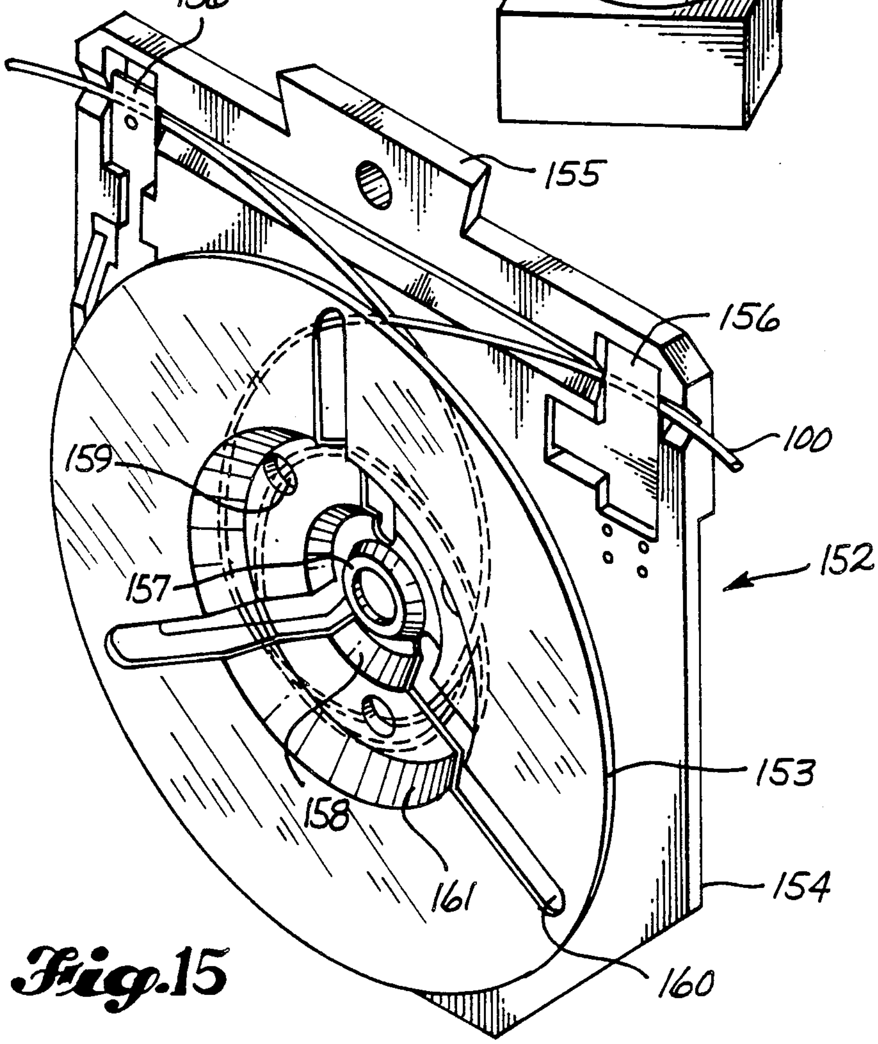
FIG. 15 is a pictorial view of a preferred embodiment of a reelette in which a wire segment is loaded for handling in the station shown in FIGS. 11-13.
Figure 16:
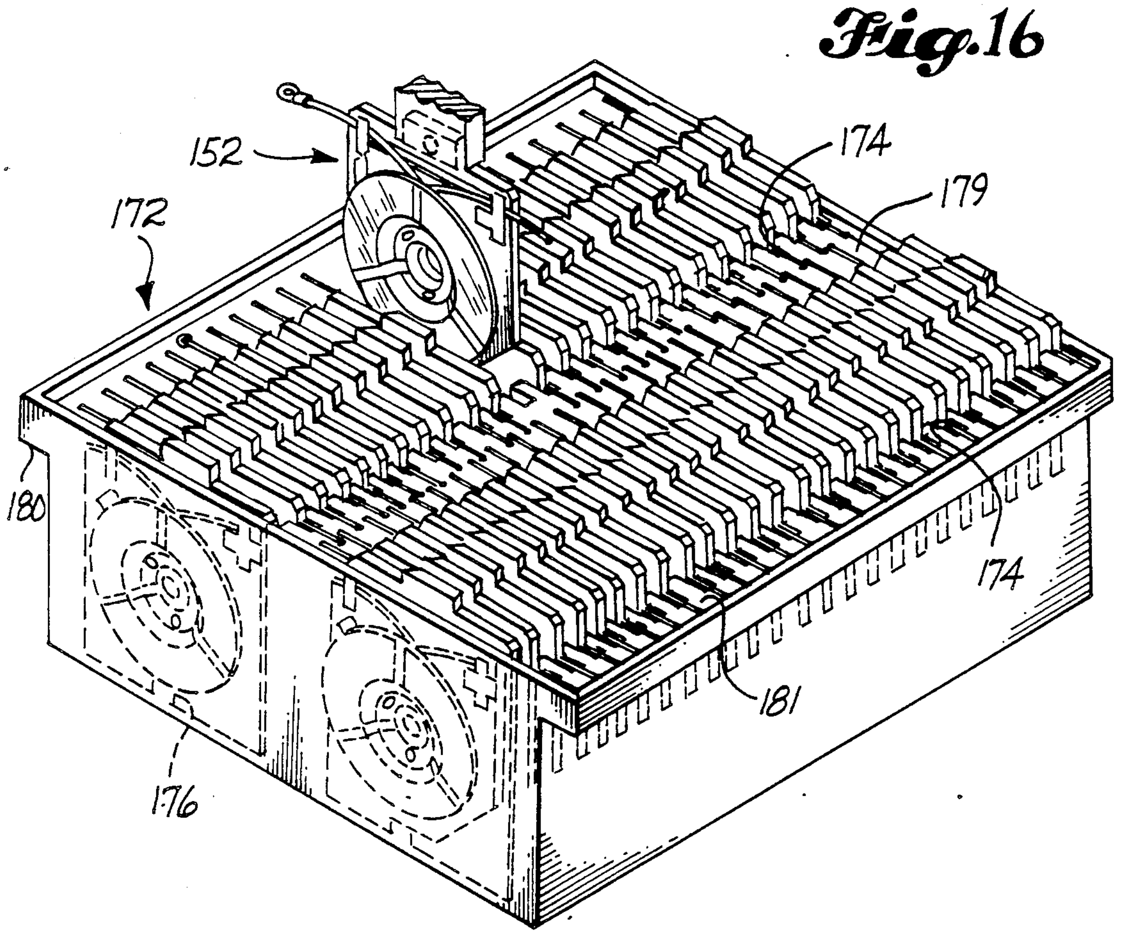
FIG. 16 is a pictorial view of a carrier for reelettes of the type shown in FIG. 15.

In the embodiment of the automated termination station 102 shown in FIGS. 11–13, each of the wire segments 100 is preferably individually wound onto its own reelette, which is in turn loaded into the carrier 172. A first preferred embodiment of the reelette 152 is shown in FIGS. 15 and 16. FIG. 16 also shows a carrier 172 adapted to receive a plurality of the reelettes 152. Preferably, the carrier 172 is dimensioned to receive fifty reelettes 152.

Referring to FIG. 15, the reelette 152 includes a back plate 154 and a removable cover 153. A center axial hub 157 is formed by the plate 154 and cover 153. The cover 153 and plate 154 abut each other over a short distance radially outward from the hub 157. Then, the cover 153 forms an inner shoulder 158 to space the cover 153 axially from the plate 154. An outer shoulder 161 is formed radially outwardly of the first shoulder 158 to increase the space between the cover 153 and plate 154. The spacing of these two main elements of the reelette 152 facilitates winding of a wire segment 100 thereon.

Once a wire segment 100 has been wound onto the reelette 152, its ends are held in position by clamps 156 carried by the back plate 154. The cover 153 and back plate 154 have a plurality of holes 159 and slots 160 extending therethrough parallel to the axis of the hub 157. These holes 159 and slots 160 facilitate the positioning of the wire segment 100 on the reelette 152, as described in more detail in the applicant's copending application entitled "Wire Harness Manufacturing System". A grip lug 155 projects upwardly from the top of the block plate 154. The lug 155 provides a means by which the work head of a robot can grip the reelette 152, as illustrated in FIG. 16. The bottom portion of the back plate 154 has a groove 162 formed thereon for the purpose described below.

Referring to FIG. 16, the carrier 172 is dimensioned to receive two rows of twenty-five reelettes 152. The opposite side edges of each reelette 152 are received into vertical slots 174 to correctly position the reelette 152. Two parallel ridges 176 project upwardly from the bottom wall of the carrier 172 and are received into the bottom grooves 162 of the reelettes 152 to aid in the positioning of the reelettes 152. The ridges 176 preferably have a plurality of tapered lateral slots which receive the reelettes 152 to position the bottoms of the reelettes 152 along the ridges 176. The bottom of the carrier 172 also has a plurality of holes 178 (FIG. 11) formed therein for minimizing the weight of the carrier 172. A center vertical wall 179 separates the two rows of reelettes 152 and forms the center slots 174. The top of the wall 179 is spaced below the top edge of the carrier 172 to accommodate the ends of the wire segments 100 extending laterally outwardly from the reelettes 152. A horizontal flange 180 is formed along the top portion of each side of the carrier 172. The inner horizontal top surface 181 of each of the flanges 180 is spaced below the top of the carrier 172 and is vertically aligned with the top of the divider wall 179 to accommodate the ends of the wire segments 100. Horizontal and downward extensions of the wall 181 form the slots 174 for the outer side edges of the reelettes 152 (relative to the carrier 172).

FIGS. 17–21 illustrate another form of the reelette 152' and carrier 172'. Like the reelette 152 shown in FIGS. 15 and 16, the reelette 152' includes a cover 153' and a back plate 154' with a center hub 157'. The reelette 152' has a plurality of slots 159', 160' that function similarly to the holes 159 and slots 160 in the reelette 152. The reelette 152' shown in FIGS. 17, 18, 20, and 21 is designed to be loaded in a carrier 172' in an orientation in which the wire segment ends are in the bottom portion of the carrier 172', rather than in the top portion, as in FIG. 16. To accommodate this different reelette orientation, the wire segment ends project from the reelette at an angle of about 90° to each other, rather than projecting laterally outwardly at an angle of 180° to each other, as in FIGS. 15 and 16. The wire segment ends are held by clamps 156'. A grip slot 155' is formed on the top edge of the reelette 152' opposite the clamps 156'.

Figure 17:
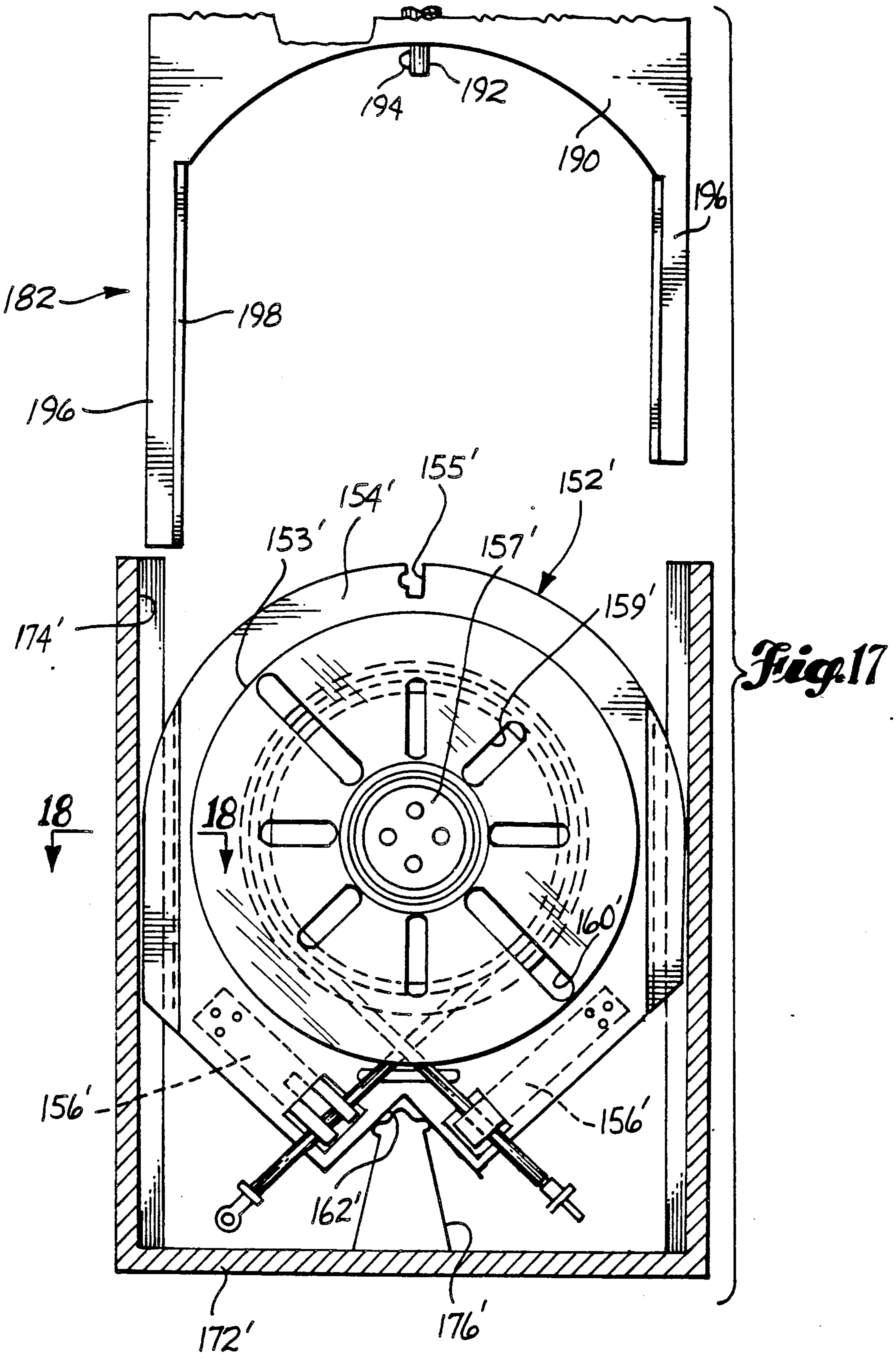
FIG. 17 is an elevational view illustrating the loading of another form of the reelette in a carrier, with parts shown in section.
Figure 18:
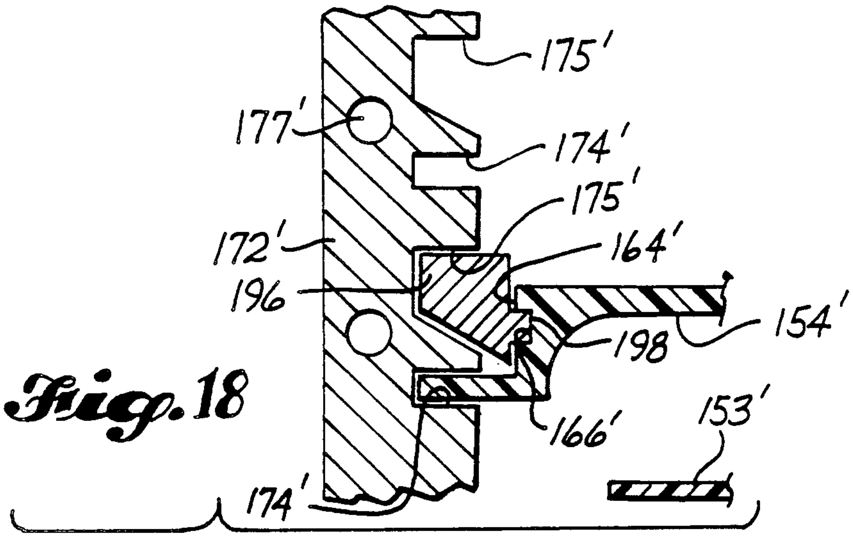
FIG. 18 is a cross-sectional view taken along the line 18—18 in FIG. 17.

The carrier 172' is shown in FIGS. 17–20. As illustrated, the carrier 172' is designed to accommodate a single row of reelettes 152'. However, it may also be constructed to accommodate two or more rows. The sidewalls of the carrier 172' have slots 174' formed therein for accommodating the side edges of the reelette back plates 154', as best seen in FIGS. 17 and 18. The sidewalls also have slots 175' formed therein for accommodating the legs 196 of a loading mechanism 182, described below. FIG. 18 illustrates the arrangement of slots 174', 175'. Referring to FIG. 17, a bottom support ridge 176' extends upwardly from the bottom wall of the carrier 172' and is received into a bottom groove 162' formed in each reelette 152' to ensure correct positioning of the reelette 152' and clearance for the wire segment ends. The sidewalls of the carrier 172' also have indexing holes 177' formed therein laterally outwardly of the slots 174', 175'.

Figure 21:
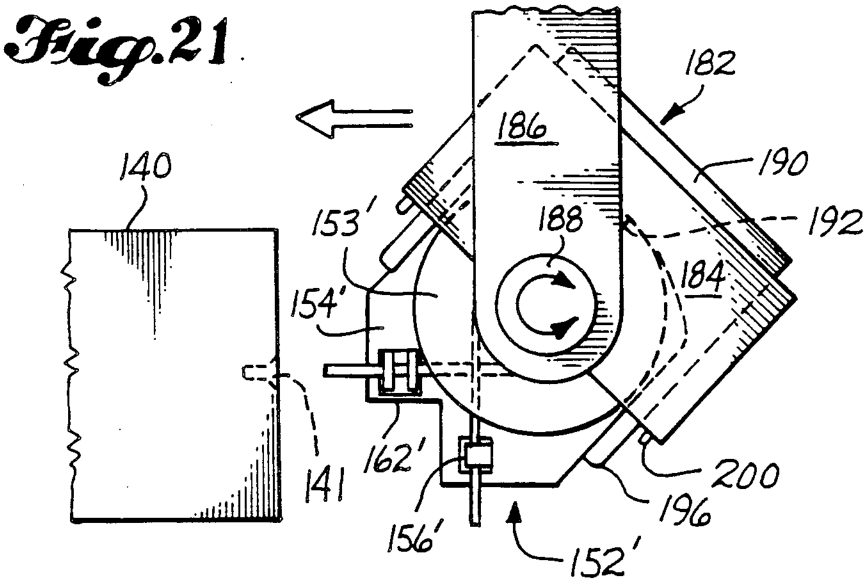
FIG. 21 is an elevational view of the reelette shown in FIG. 20 being brought toward engagement with an end processing device.
Figure 19:
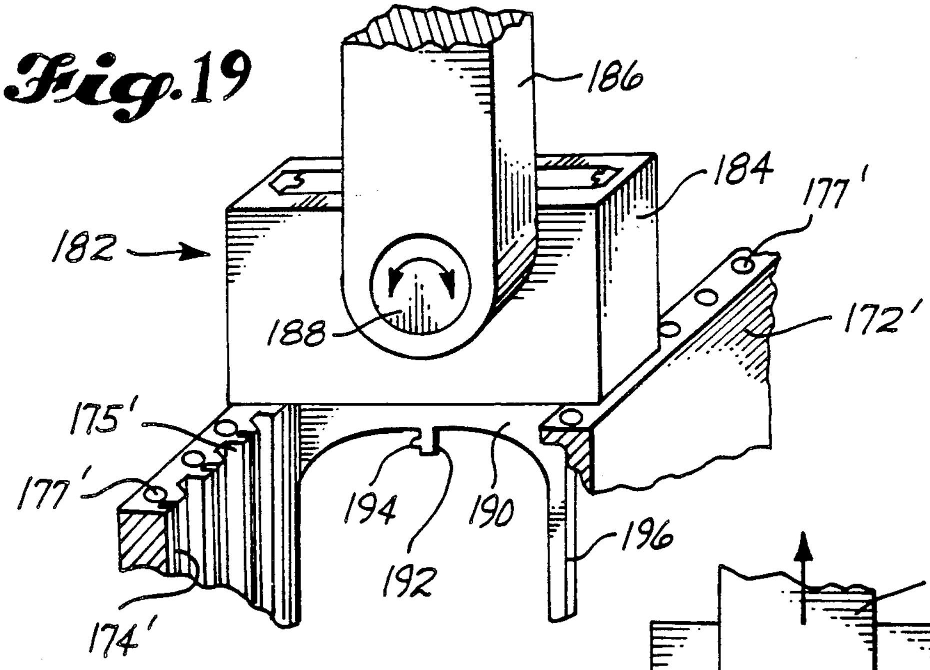
FIG. 19 is a fragmentary pictorial view illustrating the loading device shown in FIG. 17 engaging a reelette carrier.
Figure 20:
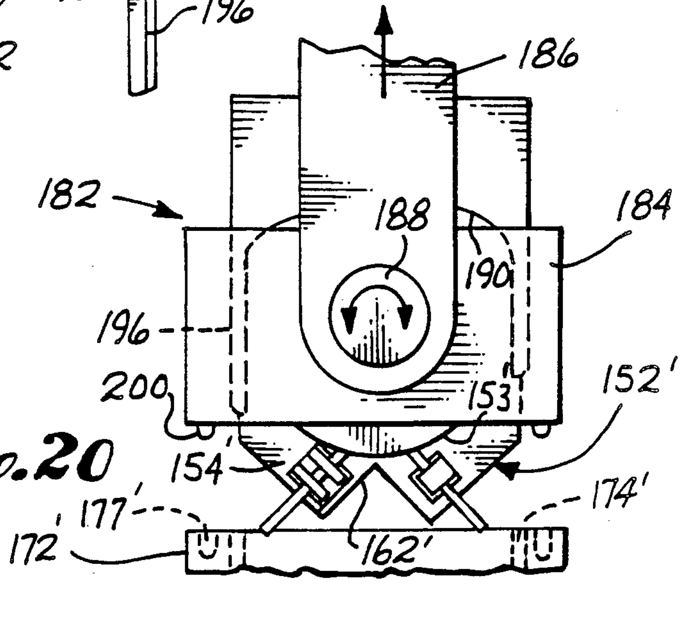
FIG. 20 is an elevational view illustrating the unloading of the type of reelette shown in FIG. 17.

A mechanism 182 for loading reelettes 152' into the carrier 172' and removing them therefrom is illustrated in FIGS. 17–21. Referring to FIGS. 19–21, the mechanism 182 includes a housing 184 mounted on a support shaft 186 by means of a pivot mount 188. The mechanism 182 has a gripper bar 190 slidably mounted thereon. The bar 190 carries a center latch member 192 and has two opposite downwardly extending legs 196. The latch member 192 includes a retractable detent 194. The inner vertical surface of each leg 196 has a key 198 formed thereon (FIGS. 17 and 18) for engaging a corresponding groove 166' in the side edge 164' of the back plate 154' of the reelette 152', as shown in FIG. 18. A plurality of tapered indexing pins 200 extend downwardly from the bottom surface of the housing 184 to engage the indexing holes 177' in the carrier 172' to precisely position the mechanism 182 relative to the carrier 172' and the reelettes 152' loaded therein.

FIG. 17 shows a reelette 152' that has just been loaded into a carrier 172' or is about to be removed therefrom. FIG. 19 illustrates the engagement of the carrier 172' by the housing 184 and legs 196. In this position, the gripper bar 190 is in its fully lowered position in which it would engage a reelette 152' positioned in the respective carrier location by engagement of the latch member 192 in the grip slot 155'. FIG. 20 illustrates the moving of the reelette 152' vertically upwardly away from the carrier 172'. As shown in FIG. 20, the gripper bar 190 is in its fully raised position relative to the housing 184. After the reelette 152' has cleared the carrier 172', the gripper bar 190 is moved downwardly relative to the housing 184 to provide clearance for end processing devices. This is illustrated in FIG. 21 in which one of the wire segment ends is positioned to be inserted into one of the funnel-shaped openings 141 in a wire stripper 140.

The operation of the automated termination station 102 to move carriers 172, 172' into, within, and out from the station 102 is described above. The handling of the wire segments 100 by the robot is illustrated by the description of the mechanism 182. In other respects, the operation of the automated termination station 102 is substantially the same as the operation of the station 2 shown in FIGS. 1-5.

Although the preferred embodiments of the invention have been illustrated and described herein, it is intended to be understood by those skilled in the art that various modifications and omissions in form and detail may be made without departing from the spirit and scope of the invention as defined by the following claims.

What is claimed is:

1. A method of processing the ends of wire segments, comprising:

providing an automated termination station having a robot with a work envelope that defines a three-dimensional area accessible to said robot, a plurality of end processing devices within said envelope, and a work depot within said envelope;

positioning a first batch of wire segments in said depot, including positioning each said segment in an access position accessible to said robot;

processing a plurality of said segments one at a time, including operating said robot to move at least an end portion of one of said plurality of segments out of said access position to bring an end thereof into processing engagement with at least one of said devices and then return said one segment to said access position, and then continuing to operate said robot to move at least an end portion of another of said plurality of segments out of said access position to bring an end thereof into processing engagement with at least one of said devices and then return said other segment to said access position; said processing continuing to so move said plurality of segments, one at a time, until all of said plurality of segments have been processed; and after processing said plurality of segments, removing said first batch from said depot to make room for a second batch of wire segments.

2. The method of claim 1, which comprises loading said first batch of wire segments in a carrier; and in which the step of positioning said first batch in said depot comprises positioning said carrier in said depot.

3. The method of claim 2, comprising engaging said carrier in said depot with an indexing device to enable said robot to accurately locate any one of said first batch of wire segments.

4. The method of claim 2, in which the steps of positioning said carrier and processing said plurality of wire segments include positioning said carrier in an initial position in said depot, then processing a portion of said plurality of wire segments, then shifting said carrier to a second position in said depot, and then processing another portion of said plurality of wire segments.

5. The method of claim 1, which comprises providing said automated termination station with an output station; and in which the step of removing includes moving said first batch from said depot to said output station to await transport away from said automated termination station, to permit said second batch of wire segments to be positioned in said depot while said first batch awaits transport.

6. The method of claim 1, which comprises providing said automated termination station with an input station, and positioning said second batch in said input station and then moving said second batch from said input station to said depot.

7. The method of claim 5, which comprises providing said automated termination station with an input station, and positioning said second batch in said input station and then moving said second batch from said input station to said depot.

8. The method of claim 2, which comprises providing said automated termination station with an output station; and in which the step of removing includes moving said carrier from said depot to said output station to await transport away from said automated termination station, to permit said second batch of wire segments to be positioned in said depot while said first batch awaits transport.

9. The method of claim 2, which comprises providing said automated termination station with an input station, loading said second batch in a second carrier, and positioning the loaded second carrier in said input station and then moving it from said input station to said depot.

10. The method of claim 8, which comprises providing said automated termination station with an input station, loading said second batch in a second carrier, and positioning the loaded second carrier in said input station and then moving it from said input station to said depot.

11. In a system for processing wire segments of the type having a wire segment transport subsystem, an independent automated termination station for processing the ends of wire segments, comprising:

a robot having a gripper and a work envelope that defines a three-dimensional area accessible to said robot;

a plurality of wire segment end processing devices positioned within said envelope; and a work depot located within said envelope, said depot being dimensioned to receive a batch of wire segments, and said depot being accessible to but independent of said wire segment transport subsystem;

said robot, said devices, and said depot being positioned relative to each other to enable said robot to process a plurality of said segments, one at a time, by gripping one of said plurality of segments with said gripper and moving at least an end portion of said one of said plurality of segments out of said depot and into processing engagement with at least one of said devices and then returning said end portion to said depot, then so moving and returning at least an end portion of another of said plurality of segments; said robot continuing to so move and return said plurality of segments, one at a time, until all of said plurality of segment shave been processed.

12. The automated termination station of claim 11, in which said depot is dimensioned to receive a carrier in which said batch of wire segments is loaded.

13. The automated termination station of claim 12, further comprising an indexing device positioned to engage said carrier in said depot to enable said robot to accurately locate any one of said batch of wire segments.

14. The automated termination station of claim 12, further comprising a shifting mechanism for shifting said carrier in position within said depot to position different portions of said batch to be processed by said robot.

15. The automated termination station of claim 12, further comprising an input station and an output station, each of which is dimensioned to receive a carrier in which a batch of wire segments is loaded, and each of which is positioned between said transport subsystem and said depot.

16. The automated termination station of claim 11, further comprising an input station and an output station, each of which is dimensioned to receive a batch of wire segments, and each of which is positioned between said transport subsystem and said depot.

17. The automated termination station of claim 11, comprising a mounting plate positioned generally above said depot for mounting said devices; said plate having a vertical opening extending therethrough aligned with said depot.

18. The automated termination station of claim 12, comprising a mounting plate positioned generally above said depot for mounting said devices; said plate having a vertical opening extending therethrough aligned with said depot.

19. The automated termination station of claim 14, comprising a mounting plate positioned generally above said depot for mounting said devices; said plate having a vertical opening extending therethrough aligned with said depot.

* * * * *

UNITED STATES PATENT AND TRADEMARK OFFICE
CERTIFICATE OF CORRECTION

PATENT NO. : 5,125,154

DATED : June 30, 1992

INVENTOR(S) : Dan A. Cross

It is certified that error appears in the above-identified patent and that said Letters Patent is hereby corrected as shown below:

Column 2, line 2, "4,803,778;" should be -- 4,803,778, --.

Column 2, line 17, "field" should be -- filed --.

Column 4, line 34, after "FIG.", insert -- 1 --.

Column 6, line 38, "mounted in" should be -- mounted on --.

Column 7, line 53, "lot" should be -- contact --.

Column 13, line 34, "block plate" should be -- back plate --.

Claim 11, column 16, line 56, "segment shave" should be -- segments have --.

Signed and Sealed this

Fifth Day of October, 1993

*Attest:*

BRUCE LEHMAN

*Attesting Officer* *Commissioner of Patents and Trademarks*